United States Patent [19]

Senoo

[11] 4,076,902
[45] Feb. 28, 1978

[54] SODIUM-SULFUR STORAGE BATTERY

[75] Inventor: Keizi Senoo, Takatsuki, Japan

[73] Assignee: Agency of Industrial Science & Technology, Tokyo, Japan

[21] Appl. No.: 732,770

[22] Filed: Oct. 15, 1976

[30] Foreign Application Priority Data
Nov. 11, 1975 Japan .................. 50-134681

[51] Int. Cl.$^2$ .................................... H01M 10/39
[52] U.S. Cl. ................................ 429/104; 429/232
[58] Field of Search ............. 429/104, 101, 103, 191, 429/30, 31, 218, 233, 235, 232

[56] References Cited

U.S. PATENT DOCUMENTS

| 3,413,150 | 11/1968 | Kummer et al. | 429/104 X |
| 3,980,496 | 9/1976 | Ludwig et al. | 429/103 |
| 3,993,503 | 11/1976 | Ludwig | 429/103 |

Primary Examiner—Anthony Skapars
Attorney, Agent, or Firm—Burns, Doane, Swecker & Mathis

[57] ABSTRACT

A sodium-sulfur storage battery having a sealed housing which contains a solid electrolyte incorporating an anodic reactant such as sodium, a cathodic current collector (which may be the housing) extending in a direction generally parallel to the solid electrolyte and cathodic electro-conductive material disposed between and in contact with the solid electrolyte and the cathodic current collector. The cathodic electro-conductive material is impregnated with a cathodic reactant and includes a fiber content, the individual fibers of which have a direction normal to the direction of the cathodic current collector. One suitable material for the cathodic electro-conductive material is a graphite felt and which is impregnated with sodium polysulfide or sulfur.

3 Claims, 5 Drawing Figures

SODIUM-SULFUR STORAGE BATTERY

BACKGROUND OF THE INVENTION

This invention relates to an improved construction for a storage battery of the sodium-sulfur type. A storage battery of this type generally comprises molten sulfur or molten sodium polysulfide as a cathodic reactant, molten sodium as an anodic reactant, and a nonporous solid electrolyte made of a special ceramic material which permits only sodium ions to pass. The battery is one which operates at a temperature of about 350° C. thereby generating electrical energy according to the following electromotive reaction:

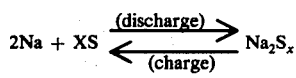

In a conventional battery of this type, a cathodic electric conductor such as graphite felt, which is impregnated with cathodic reactant, has been spirally wound around a solid electrolyte tube incorporating an anodic reactant, and these components are enclosed in a battery housing which also functions as a cathodic current collector. In this case, however, fibers of the graphite felt have been directed principally parallel with the current collection, i.e., the battery housing or the solid electrolyte tube, so that comparatively higher internal resistance of the battery thus produced has resulted in inferior performance and a shorter service life. Further, excess or deficient amounts of the cathodic reactant impregnated in the cathodic electro-conductive material has also caused inferiority in performance and a reduction in service life. This invention is intended to obviate all of the above mentioned disadvantages.

BRIEF SUMMARY OF THE INVENTION

An object of this invention is to provide a sodium-sulfur storage battery having an excellent performance.

A further object of this invention is to provide a sodium sulfur storage battery having a long service life.

A still further object of this invention is to provide a sodium-sulfur storage battery which is simple in fabrication and cheap in cost.

In accordance with the principles of the invention the improved sodium-sulfur storage battery comprises a sealed housing which contains a solid electrolyte incorporating an anodic reactant such as sodium, a cathodic current collector (which may be the housing) extending in a direction generally parallel to the solid electrolyte and cathodic electro-conductive material disposed between and in contact with the solid electrolyte and the cathodic current collector. The cathodic electro-conductive material is impregnated with a cathodic reactant and includes a fiber content, the individual fibers of which have a direction normal to the direction of the cathodic current collector. One suitable material for the cathodic electro-conductive material is a graphite felt and which is impregnated with sodium polysulfide or sulfur.

BRIEF DESCRIPTION OF DRAWINGS

The invention will be better understood from the following description of a preferred embodiment and in connection with the accompanying drawings in which:

FIGS. 2 and 3 are enlarged views of an essential part A of FIG. 1, in which FIG. 2 represents a conventional storage battery and FIG. 3 represents that of the present invention, respectively;

DETAILED DESCRIPTION

Figure 1:
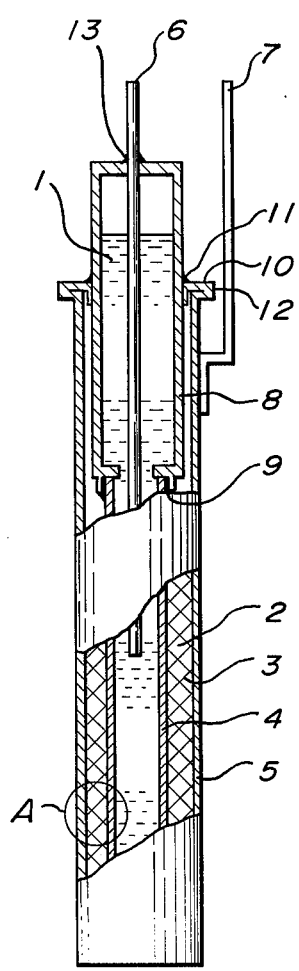
FIG. 1 is a vertical sectional view of the sodium-sulfur storage battery of this invention.

With reference now to FIG. 1, 1 is sodium which serves as the anodic reactant, 2 is a sodium polysulfide or sulfur for the cathodic reactant, 3 is a cathodic electro-conductive material (electric conductor) such as a graphite felt that is impregnated with or infiltrated in the cathodic reactant. The sulfur or sodium polysulfide for the cathodic reactant has an inferior electro-conductivity in itself, so that a metal fiber or carbon fiber having superior corrosion-resistant and electro-conductive properties is used for the electric conductor 3. The graphite felt is a graphitized non-woven cloth of polyacrylonitrile or rayon. Fiber diameter ranges from about 10 to 50 $\mu$ and its porosity attains approximately 95%. 4 is a solid electrolyte which selectively permits only sodium ions to pass, and is made in a tubular shape with $\beta$-alumina. 5 is a battery housing made of stainless steel, which also functions as the cathodic current collector. As shown in the drawings, the graphite felt 3 impregnated with the cathodic reactant 2 completely fills the annular space between the solid electrolyte 4 and battery housing 5. 6 is an anodic terminal and 7 is a cathodic terminal welded to the battery housing 5. An anodic reservoir 8 made of $\alpha$-alumina is soldered to and sealed with the solid electrolyte at a jointing part of solder glass 9. One side of a cover 10 made of a nickel-cobalt-steel alloy is soldered to and sealed with the anodic reservoir 8 using solder glass at a sealed part 11, and the other side is welded to the battery housing 5 at a welded part 12. 13 is a sealed opening through the end wall of anodic reservoir 8, through which the anodic terminal 6 is passed, and soldered to it.

A feature of the present invention is that the metallic fibers or carbon fibers such as the graphite felt, which is used as the cathodic electro-conductive material 3, impregnated with the cathodic reactant 2, are arranged in a direction normal to the cathodic current collector of the battery housing 5 and the solid electrolyte 4.

Figure 2:
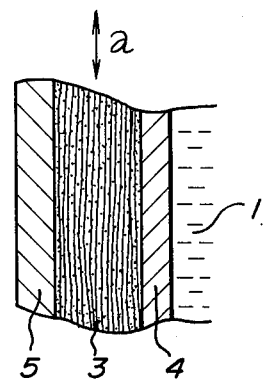

In a conventional storage battery, the fibers of the graphite felt have been oriented in the direction indicated by arrow $a$ as shown in FIG. 2. That is to say, the fiber direction is parallel with the cathodic current collector i.e., the battery housing 5 and the solid electrolyte 4.

Figure 3:
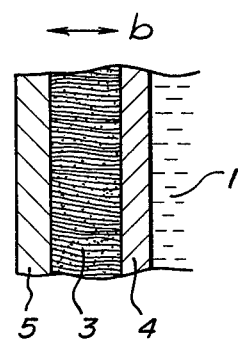

According to the present invention, the fiber direction of the graphite felt is as indicated by arrow $b$ in FIG. 3. That is to say, the fiber direction is normal to the cathodic current collector i.e. the battery housing 5 and the solid electrolyte 4. It is advantageous to make the fibers of the graphite felt adhere closely to the cathodic current collector 5, that is, to form the graphite felt in the shape of a toroid.

Figure 4:
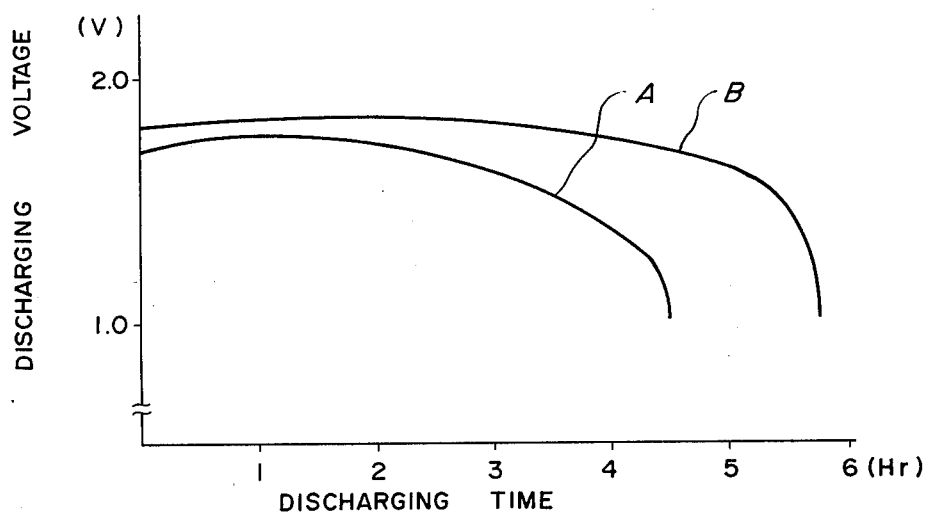
FIG. 4 is a family of curves showing different discharging characteristics for different batteries tested under the same condition, in which curve A represents the discharge of a conventional storage battery of the sodium-sulfur type and curve B represents the discharge characteristic of the improved battery in accordance with the present invention.

FIG. 4 shows voltage-time characteristic discharge curves in which a current of 5 amperes is discharged from a storage battery comprising the graphite felt and the sulfur for the cathodic reactant at 8% weight ratio of the former to the latter. The curve A shows the discharge characteristic from a conventional storage battery in which a graphite felt of 3mm thick is wound around the solid electrolytic tube, the fiber direction being in the direction "a" as illustrated in FIG. 2. On the other hand, the discharge characteristic curve B is that of a storage battery according to the present invention, in which the fibers of the graphite felt have a direction as indicated by the arrow b in FIG. 3, i.e., a direction normal to the cathodic current collector. A suitable configuration for the graphite felt in accordance with the invention is in the shape of a toroid, these being stacked one upon the other and filling the annular space formed between the tubular battery housing 5 and the tubular solid electrolyte tube 4. As can be inferred from FIG. 4, a battery according to the present invention with a discharge characteristic of curve B is able to discharge at a higher voltage for a longer period of time and has a larger capacity as compared with a conventional storage battery with a discharge characteristic of curve A.

Another feature of the present invention is that the weight ratio of the graphite felt for the cathodic electro-conductive material to the sulfur for the cathodic reactant is restricted to within a range of 4 to 20%. The internal resistance of the battery will increase at a weight ratio thereof below 4% and an amount of the cathodic reactant will decrease at a weight ratio above 20%, thus leading to a decrease in battery capacity or deterioration of performance in either case.

Figure 5:
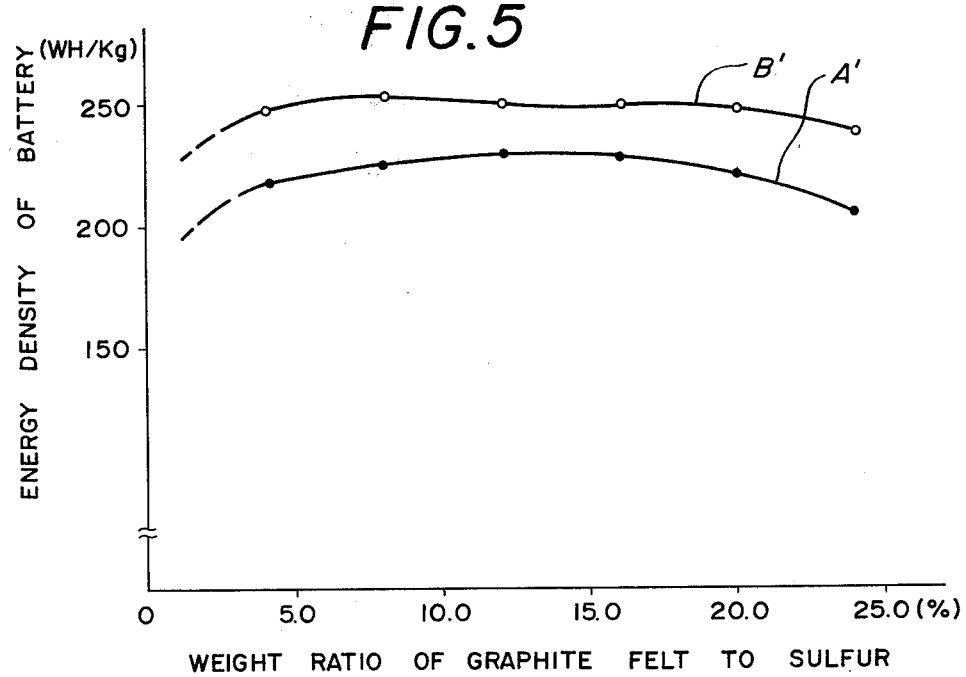
FIG. 5 is a family of curves showing the relation between the weight ratio of the cathodic electro-conductive material, i.e., graphite felt to the cathodic reactant, i.e., sulfur and the energy density of battery, in which curve A' represents the characteristic of a conventional storage battery and curve B' represents the characteristic of a storage battery according to the present invention.

FIG. 5 are curve plots showing the relation between various weight ratios of the cathodic electro-conductive material, i.e., graphite felt to the cathodic reactant, i.e., sulfur and the energy density of battery. The curve A' represents a conventional battery in which the graphite felt is wound around the solid electrolytic tube, the direction of the fibers in the graphite felt being parallel with the cathodic current collector. The curve B' represents the storage battery according to the present invention in which the direction of the fibers in the graphite felt is normal to the cathodic current collector. As can be seen from FIG. 5 comparing the curves A' and B', both the discharging voltage and storage capacity can be increasingly improved by restricting the weight ratio of the cathodic electro-conductive material to the cathodic reactant to within the range of 4 to 20% and by only changing the direction of the fibers of the cathodic electro-conductive material from parallel to normal to the cathodic current collector even when the weight ratio remains as before.

While the principles of the invention have been described in connection with a preferred embodiment of the invention, it is to be understood that departures from this specific construction can be made without, however, departing from the scope of the invention as defined in the appended claims. As an example, in the illustrated embodiment the battery housing itself being made of a stainless steel functions also as the cathodic current collector component. However, the cathodic current collector need not be the battery housing but can be a separate component which is placed inside the battery housing. In such case for example it can be in the form of molybdenum wire, ribbon or the like which is tied to or wound around the graphite felt, or it can be in the form of a liner tube inside the battery housing so that both the collector and graphite felt will adhere very closely to each other thereby to further minimize the internal resistance of the battery and increase the storage capacity thus providing a great advantage. Also, different types of fibers other than the ones specifically mentioned may be used for the cathodic electro-conductive material so long as they are impregnable with the cathodic reactant and have a good electrical conductivity characteristic and are oriented in a direction normal to the cathodic current collector. Other types of sulfur-containing cathodic reactants can also be utilized. Other materials can also be used for the solid electrolyte.

I claim:

1. A sodium-sulfur storage battery comprising
a sealed housing, said housing containing a solid electrolyte tube incorporating an anodic reactant therein,
a cathodic current collector extending in a direction generally parallel to said solid electrolyte tube,
cathodic electro-conductive material made of graphite felt including a fiber content the individual fibers of which have a direction normal to the direction of said cathodic current collector and being impregnated with a cathodic reactant, said graphite felt being disposed between and in contact with said solid electrolyte tube and cathodic current collector with no space remaining except for spaces between fibers in graphite felt,
and the weight ratio of the graphite felt to the cathodic reactant is restricted to a range of from 4 to 20%.

2. A sodium-sulfur storage battery as defined in claim 1 wherein said housing also functions as said cathodic current collector.

3. A sodium-sulfur storage battery as defined in claim 1 wherein said cathodic current collector is disposed within said housing.

* * * * *